US012277845B2

(12) United States Patent
Selevan et al.

(10) Patent No.: US 12,277,845 B2
(45) Date of Patent: Apr. 15, 2025

(54) VEHICULAR INCURSION ALERT SYSTEMS AND METHODS

(71) Applicants: Adam Jordan Selevan, Laguna Beach, CA (US); Daniel Joseph Selevan, Laguna Beach, CA (US); James R Selevan, Laguna Beach, CA (US)

(72) Inventors: Adam Jordan Selevan, Laguna Beach, CA (US); Daniel Joseph Selevan, Laguna Beach, CA (US); James R Selevan, Laguna Beach, CA (US)

( * ) Notice: Subject to any disclaimer, the term of this patent is extended or adjusted under 35 U.S.C. 154(b) by 0 days.

(21) Appl. No.: 18/090,088

(22) Filed: Dec. 28, 2022

(65) Prior Publication Data

US 2023/0215258 A1 Jul. 6, 2023

Related U.S. Application Data

(60) Provisional application No. 63/294,608, filed on Dec. 29, 2021.

(51) Int. Cl.

| | |
|---|---|
| ***G08B 21/02*** | (2006.01) |
| ***G08B 13/00*** | (2006.01) |
| ***G08G 1/01*** | (2006.01) |
| ***G08G 1/16*** | (2006.01) |

(52) U.S. Cl.

CPC ............. *G08B 21/02* (2013.01); *G08B 13/00* (2013.01); *G08G 1/01* (2013.01); *G08G 1/164* (2013.01)

(58) Field of Classification Search

CPC ..... G01S 13/931; G01S 13/886; G08G 1/162; G08G 1/096783; G08G 1/096766; G08G 1/0116; G08G 1/02; G08B 5/006; B60Q 1/525; B60Q 5/006; B60Q 9/008; E01F 9/30; B61L 23/06

See application file for complete search history.

(56) References Cited

U.S. PATENT DOCUMENTS

| | | | |
|---|---|---|---|
| 3,500,378 | A | 3/1970 | Pickering et al. |
| 3,787,867 | A | 1/1974 | Dodge et al. |
| 3,846,672 | A | 11/1974 | Doughty |
| 4,132,983 | A | 1/1979 | Shapiro |
| 4,249,159 | A | 2/1981 | Stasko |
| 4,345,305 | A | 8/1982 | Kolm et al. |
| 4,827,245 | A | 5/1989 | Lipman |
| 4,841,278 | A | 6/1989 | Tezuka et al. |
| 5,294,924 | A | 3/1994 | Dydzyk |

(Continued)

FOREIGN PATENT DOCUMENTS

| | | | |
|---|---|---|---|
| CN | 102147954 | A | 8/2011 |
| CN | 105812673 | A | 7/2016 |

(Continued)

OTHER PUBLICATIONS

Non-Final Office Action Dated Aug. 11, 2014 in U.S. Appl. No. 13/775,177.

(Continued)

*Primary Examiner* — Benyam Haile

(74) *Attorney, Agent, or Firm* — Robert D. Buyan; Stout, Uxa & Buyan, LLP

(57) ABSTRACT

Systems and methods for alerting personnel (e.g., workers, emergency responders, pedestrians, observers, etc.) that a vehicle (e.g., car, truck, watercraft, etc.) has entered into, or crossed a boundary of, a protected area or zone.

21 Claims, 6 Drawing Sheets

(56) References Cited

U.S. PATENT DOCUMENTS

| | | | |
|---|---|---|---|
| 5,345,232 | A | 9/1994 | Robertson |
| 5,428,546 | A | 6/1995 | Shah et al. |
| 5,438,495 | A | 8/1995 | Ahlen et al. |
| 5,551,370 | A | 9/1996 | Hwang |
| 5,673,039 | A | 9/1997 | Pietzsch et al. |
| 5,754,124 | A | 5/1998 | Daggett et al. |
| 6,299,379 | B1 | 10/2001 | Lewis |
| 6,332,077 | B1 | 12/2001 | Wu et al. |
| 6,486,797 | B1 | 11/2002 | Laidman |
| 6,549,121 | B2 | 4/2003 | Povey et al. |
| 6,614,358 | B1 | 9/2003 | Hutchison et al. |
| D498,164 | S | 11/2004 | Delich |
| 6,929,378 | B2 | 8/2005 | Wang |
| D510,289 | S | 10/2005 | Dueker et al. |
| 6,963,275 | B2 | 11/2005 | Smalls |
| D515,957 | S | 2/2006 | Dueker et al. |
| D515,958 | S | 2/2006 | Dueker et al. |
| 7,088,222 | B1 | 8/2006 | Dueker et al. |
| 7,106,179 | B1 | 9/2006 | Dueker et al. |
| 7,182,479 | B1 | 2/2007 | Flood et al. |
| 7,230,546 | B1 | 6/2007 | Nelson et al. |
| 7,277,809 | B1 | 10/2007 | DeWitt, Jr. et al. |
| 7,298,244 | B1 | 11/2007 | Cress et al. |
| 7,301,469 | B1 | 11/2007 | Hoffman et al. |
| D560,533 | S | 1/2008 | Dueker et al. |
| D564,387 | S | 3/2008 | Rubin et al. |
| 7,455,419 | B2 | 11/2008 | Helget et al. |
| 7,563,158 | B2 | 7/2009 | Haschke et al. |
| D631,582 | S | 1/2011 | Hwang |
| 8,072,345 | B2 | 12/2011 | Gallo |
| D654,387 | S | 2/2012 | Wilson et al. |
| 8,154,424 | B2 | 4/2012 | Selevan |
| 8,220,950 | B1 | 7/2012 | Sunshine |
| D669,805 | S | 10/2012 | Edwards et al. |
| D678,100 | S | 3/2013 | Hwang |
| 8,550,653 | B2 | 10/2013 | Wilson et al. |
| 8,564,456 | B2 | 10/2013 | Selevan |
| 8,579,460 | B2 | 11/2013 | Wilson et al. |
| 8,602,584 | B2 | 12/2013 | Ghafoori et al. |
| 8,643,511 | B1 | 2/2014 | Batterson |
| 8,672,517 | B2 | 3/2014 | Chung et al. |
| 8,770,774 | B2 | 7/2014 | Ye et al. |
| 8,786,461 | B1 | 7/2014 | Daudelin |
| 8,949,022 | B1 | 2/2015 | Fahrner et al. |
| 9,066,383 | B2 | 6/2015 | Gerszberg |
| 9,288,088 | B1 | 3/2016 | McIlroy |
| 9,437,109 | B1 | 9/2016 | Stafford et al. |
| 9,489,809 | B1 | 11/2016 | Dever et al. |
| D778,752 | S | 2/2017 | Selevan |
| D778,753 | S | 2/2017 | Selevan |
| 9,835,319 | B2 | 12/2017 | Selevan et al. |
| 9,987,981 | B1 * | 6/2018 | Deyaf .................... B60Q 5/006 |
| 10,066,808 | B2 | 9/2018 | Fernando |
| 10,443,828 | B2 | 10/2019 | Selevan et al. |
| 2002/0006313 | A1 | 1/2002 | Pas |
| 2002/0008637 | A1 | 1/2002 | Lemelson et al. |
| 2002/0036908 | A1 | 3/2002 | Pederson |
| 2002/0067290 | A1 | 6/2002 | Peet, II et al. |
| 2002/0115423 | A1 | 8/2002 | Hatae et al. |
| 2002/0154787 | A1 | 10/2002 | Rice et al. |
| 2002/0159251 | A1 | 10/2002 | Hart |
| 2002/0175831 | A1 | 11/2002 | Bergan et al. |
| 2003/0164666 | A1 | 9/2003 | Crunk |
| 2004/0056779 | A1 | 3/2004 | Rast |
| 2004/0100396 | A1 | 5/2004 | Antico et al. |
| 2004/0113817 | A1 | 6/2004 | Novak et al. |
| 2004/0124993 | A1 | 7/2004 | George |
| 2004/0183694 | A1 | 9/2004 | Bauer |
| 2004/0263330 | A1 | 12/2004 | Alarcon |
| 2004/0264440 | A1 | 12/2004 | Wan et al. |
| 2005/0040970 | A1 | 2/2005 | Hutchins et al. |
| 2005/0134478 | A1 | 6/2005 | Mese et al. |
| 2005/0210722 | A1 | 9/2005 | Graef et al. |
| 2005/0248299 | A1 | 11/2005 | Chemel et al. |
| 2005/0254246 | A1 | 11/2005 | Huang |
| 2006/0072306 | A1 | 4/2006 | Woodyard |
| 2006/0097882 | A1 | 5/2006 | Brinkerhoff et al. |
| 2006/0104054 | A1 | 5/2006 | Coman |
| 2006/0165025 | A1 | 7/2006 | Singh et al. |
| 2007/0038743 | A1 | 2/2007 | Hellhake et al. |
| 2007/0099625 | A1 | 5/2007 | Rosenfeld |
| 2007/0115139 | A1 | 5/2007 | Witte et al. |
| 2007/0153520 | A1 | 7/2007 | Curran et al. |
| 2007/0155139 | A1 | 7/2007 | Hecht et al. |
| 2007/0194906 | A1 | 8/2007 | Sink |
| 2007/0222638 | A1 | 9/2007 | Chen et al. |
| 2007/0222640 | A1 | 9/2007 | Guelzow et al. |
| 2007/0250212 | A1 | 10/2007 | Halloran et al. |
| 2007/0273509 | A1 | 11/2007 | Gananathan |
| 2007/0273552 | A1 | 11/2007 | Tischer |
| 2008/0037431 | A1 | 2/2008 | Werb et al. |
| 2008/0042866 | A1 | 2/2008 | Morse et al. |
| 2008/0091304 | A1 | 4/2008 | Ozick et al. |
| 2008/0122607 | A1 | 5/2008 | Bradley |
| 2008/0122656 | A1 | 5/2008 | Carani et al. |
| 2008/0150758 | A1 | 6/2008 | Vallejo, Sr. |
| 2008/0198038 | A1 | 8/2008 | Yingst et al. |
| 2008/0242220 | A1 | 10/2008 | Wilson et al. |
| 2008/0267259 | A1 | 10/2008 | Budampati et al. |
| 2009/0009406 | A1 | 1/2009 | Chu et al. |
| 2009/0034258 | A1 | 2/2009 | Tsai et al. |
| 2009/0034419 | A1 | 2/2009 | Flammer, III et al. |
| 2009/0063030 | A1 | 3/2009 | Howarter et al. |
| 2009/0115336 | A1 | 5/2009 | Wang |
| 2009/0174572 | A1 | 7/2009 | Smith |
| 2009/0187300 | A1 | 7/2009 | Everitt |
| 2010/0109898 | A1 | 5/2010 | Kensy et al. |
| 2010/0259199 | A1 | 10/2010 | McDermott |
| 2011/0010094 | A1 | 1/2011 | Simon |
| 2011/0175719 | A1 | 7/2011 | Ford |
| 2011/0249430 | A1 | 10/2011 | Stamatatos et al. |
| 2011/0249688 | A1 | 10/2011 | Liu |
| 2012/0051056 | A1 | 3/2012 | Derks et al. |
| 2012/0139425 | A1 | 6/2012 | Kim |
| 2012/0249341 | A1 | 10/2012 | Brown et al. |
| 2012/0256765 | A1 | 10/2012 | Selevan |
| 2012/0277934 | A1 | 11/2012 | Ohtomo et al. |
| 2012/0287611 | A1 | 11/2012 | Wilson et al. |
| 2013/0113634 | A1 | 5/2013 | Hutchinson et al. |
| 2013/0114268 | A1 | 5/2013 | Shigematsu et al. |
| 2013/0166193 | A1 | 6/2013 | Goldman et al. |
| 2013/0214924 | A1 | 8/2013 | Ko |
| 2013/0221852 | A1 | 8/2013 | Bowers et al. |
| 2013/0260695 | A1 | 10/2013 | Wang |
| 2013/0271294 | A1 | 10/2013 | Selevan |
| 2013/0293396 | A1 | 11/2013 | Selevan |
| 2014/0071681 | A1 | 3/2014 | Ghafoori et al. |
| 2014/0126187 | A1 | 5/2014 | Bennett et al. |
| 2014/0210373 | A1 | 7/2014 | Baret |
| 2015/0009682 | A1 | 1/2015 | Clough |
| 2015/0077234 | A1 | 3/2015 | Fullam |
| 2015/0117010 | A1 | 4/2015 | Auen |
| 2015/0330616 | A1 | 11/2015 | Preuschl et al. |
| 2015/0338079 | A1 | 11/2015 | Preuschl et al. |
| 2015/0366275 | A1 | 12/2015 | Cserfoi |
| 2015/0369456 | A1 | 12/2015 | Creusen et al. |
| 2016/0144778 | A1 | 5/2016 | Tucker |
| 2016/0174099 | A1 | 6/2016 | Goldfain |
| 2016/0186971 | A1 | 6/2016 | Selevan et al. |
| 2016/0248506 | A1 | 8/2016 | Ryan et al. |
| 2017/0097128 | A1 | 4/2017 | Stafford |
| 2017/0124836 | A1 * | 5/2017 | Chung ............... G08B 21/0415 |
| 2017/0151994 | A1 | 6/2017 | Braunberger |
| 2017/0160392 | A1 | 6/2017 | Brisimitzakis et al. |
| 2017/0287217 | A1 | 10/2017 | Kim et al. |
| 2017/0354019 | A1 | 12/2017 | Julian et al. |
| 2017/0355300 | A1 | 12/2017 | Kurata |
| 2018/0079463 | A1 | 3/2018 | Pearce |
| 2019/0018132 | A1 | 1/2019 | Decker et al. |
| 2019/0132709 | A1 | 5/2019 | Graefe et al. |

(56) References Cited

U.S. PATENT DOCUMENTS

| | | | | |
|---|---|---|---|---|
| 2021/0065530 | A1* | 3/2021 | Fairweather | E01F 9/30 |
| 2021/0237777 | A1* | 8/2021 | Selevan | G06V 20/56 |

FOREIGN PATENT DOCUMENTS

| | | | |
|---|---|---|---|
| DE | 102008011228 | A1 | 8/2009 |
| EP | 1531444 | A2 | 5/2005 |
| JP | 03-162279 | A | 7/1991 |
| JP | 06-024012 | U | 3/1994 |
| JP | 11260102 | A | 9/1999 |
| JP | 2000-078666 | A | 3/2000 |
| JP | 2005-019013 | A | 1/2005 |
| JP | 3108195 | U | 4/2005 |
| JP | 2005113636 | A | 4/2005 |
| JP | 2007501971 | A | 2/2007 |
| JP | 2010/157213 | A | 7/2010 |
| JP | 2010221874 | A | 10/2010 |
| JP | 2011-254651 | A | 12/2011 |
| JP | 2012-060464 | A | 3/2012 |
| JP | 2013-131809 | A | 7/2013 |
| JP | 2014-056670 | A | 3/2014 |
| JP | 2014-107230 | A | 6/2014 |
| JP | 2014130409 | A | 7/2014 |
| JP | 2015-041438 | A | 3/2015 |
| JP | 2015-115317 | A | 6/2015 |
| JP | 2015-216050 | A | 12/2015 |
| JP | 3208109 | U | 12/2016 |
| JP | 2017092652 | A | 5/2017 |
| TW | 201528878 | A | 7/2015 |
| WO | WO 98/21519 | A1 | 5/1998 |
| WO | WO 2003/026358 | A1 | 3/2003 |
| WO | WO2005/015520 | A1 | 2/2005 |
| WO | WO 2007/030852 | A1 | 3/2007 |
| WO | WO 2009/111184 | A2 | 9/2009 |
| WO | WO2012/002163 | A1 | 1/2012 |
| WO | WO2012/064951 | A2 | 5/2012 |
| WO | WO 2014/099953 | A1 | 6/2014 |
| WO | WO 2014/115541 | A1 | 7/2014 |
| WO | WO 2014/130842 | A1 | 8/2014 |
| WO | WO 2016/070193 | A1 | 5/2016 |
| WO | WO2016/077812 | A1 | 5/2016 |
| WO | WO2017054162 | A1 | 4/2017 |
| WO | WO2019175422 | A1 | 9/2019 |
| WO | WO2021/104031 | A1 | 6/2021 |

OTHER PUBLICATIONS

Final Office Action Dated May 8, 2015 in U.S. Appl. No. 13/774,029.
Final Office Action Dated Mar. 30, 2015 in U.S. Appl. No. 13/775,177.
Non-Final Office Action Dated Sep. 18, 2015 in U.S. Appl. No. 13/775,177.
Non-Final Office Action Dated Mar. 25, 2015 in U.S. Appl. No. 14/186,582.
Non-Final Office Action Dated Jan. 7, 2020 in U.S. Appl. No. 16/522,282.
Non-Final Office Action Dated Jan. 17, 2020 in U.S. Appl. No. 16/573,762.
Non-Final Office Action Dated Jan. 22, 2019 in U.S. Appl. No. 16/029,379.
Final Office Action Dated Sep. 5, 2019 in U.S. Appl. No. 16/029,379.
Non-Final Office Action Dated Nov. 30, 2016 in U.S. Appl. No. 15/177,192.
Non-Final Office Action Dated Apr. 19, 2017 in U.S. Appl. No. 14/941,646.
Office Action Dated Sep. 5, 2023 in corresponding European Patent Application No. 18751574.7.
Extended European Search Report dated Dec. 19, 2023 in related European Application No. 21738082.3.
Finley, M.D. et al., "Sequential Warning Light System for Work Zone Lane Closures," Texas Transportation System, (2011) pp. 1-23.
Sun, C. et al., "Cost-Benefit Analysis of Sequential Warning Lights in Nighttime Work Zone Tapers", University of Missouri, Report to the Smart Work Zone Deployment Initiative, Jun. 6, 2011.
Internet Website Screen Capture, www.empco-lite.com; Sep. 6, 2010.
PCT International Search Report dated Apr. 27, 2018 in PCT Application No. PCT/US2018/017683.
International Search Report and Written Opinion dated May 28, 2014 in PCT Application US2014/017756. International Filing Date Feb. 21, 2014.
PCT International Search Report dated Mar. 18, 2016 in PCT Application No. PCT/US2015/060770.
PCT International Search Report dated Oct. 26, 2018 in related PCT Application No. PCT/US2018/041126.
Extended European Search Report dated Jun. 20, 2018 in related European Application No. 15858697.4.
Office Action Dated Oct. 23, 2019 in related Japanese Patent Application No. 2017-544855.
Non-Final Office Action Dated Mar. 17, 2011 in U.S. Appl. No. 12/381,565.
Non-Final Office Action Dated Nov. 8, 2012 in U.S. Appl. No. 13/440,930.
Non-Final Office Action Dated Oct. 8, 2014 in U.S. Appl. No. 13/774,029.
Non-Final Office Action Dated May 11, 2018 in U.S. Appl. No. 15/831,065.
Final Office Action Dated Dec. 27, 2018 in U.S. Appl. No. 15/831,065.
Final Office Action Dated Apr. 30, 2020 in U.S. Appl. No. 16/522,282.
Extended European Search Report dated Dec. 2, 2020 in related European Application No. 18751574.7.
Car 2 Car Communications Consortium: "Car 2 Car Communication Consortium Manifesto; Overview of the C2C-CC System, Version 1.1", Internet Citation, Aug. 2007, pp. 1-94, Retrieved from the Internet: URL:http://www.car-to-car.org/fileadmin/downloads/C2C-CC_manifesto.v1.1.pdf.
Jiang, Daniel et al., "Design of 5.9 ghz dsrc-based vehicular safety communication", IEEE Wireless Commmunications, Coordinated Science Laboratory; Dept. Electrical and Computer Engineering, University of Illinois at Urbana-Champaign, US, vol. 13, No. 5, Oct. 2006, pp. 36-43.
Caveney, Derek,"Cooperative Vehicular Safety Applications", IEEE Control Systems Magazine, IEEE Service Center, Piscataway, NJ, US, vol. 30, No. 4, Aug. 2010, pp. 38-53.
Bourkerche, A. et al, "Vehicular Ad Hoc Networks: A New Challange for Localization-Based Systems", Computer Communications, Elsevier Science Publishers, vol. 31, No. 12, Jul. 2008, pp. 2838-2849.
Rola Naja, "Wireless Vehicular Networks for Car Collision Avoidance", in "Wireless Vehicular Networks for Car Collision Avoidance", May 2013, Springer Verlag, retrieved from the Internet: URL:https://www.springer.com/de/book/9871441995629.
Extended European Search Report dated Mar. 2, 2021 in related European Application No. 18828265.1.
Office Action Dated Mar. 3, 2021 in corresponding Chinese Patent Application No. 201880057575.3.
PCT International Search Report dated Jul. 22, 2021 in PCT Application No. PCT/US2021/012872.
Office Action Dated Oct. 21, 2021 in corresponding European Patent Application No. 18751574.7.
Office Action Dated Oct. 11, 2021 in corresponding Chinese Patent Application No. 201880057575.3.
Office Action Dated Jan. 11, 2022 in related Japanese Patent Application No. 2019-543284.
Liu, Zhitian et al., "Efficient Single-Layer White Light-Emitting Devices Based on Silole-Containing Polymers," Journal of Display Technology, Mar. 2013.
Office Action Dated Feb. 7, 2023 in related Japanese Patent Application No. 2022-068386.
Office Action Dated May 9, 2023 in related Japanese Patent Application No. 2020-521857.
PCT International Search Report dated Apr. 26, 2023 in related PCT Application No. PCT/US2022/054158.
PCT International Search Report dated Jul. 14, 2023 in related PCT Application No. PCT/US2023/012840.

(56) References Cited

OTHER PUBLICATIONS

Office Action Dated Oct. 17, 2023 in corresponding Japanese Patent Application No. 2023-005832.

* cited by examiner

VEHICULAR INCURSION ALERT SYSTEMS AND METHODS

RELATED APPLICATION

This application claims priority to U.S. Provisional Patent Application No. 63/294,608 entitled Vehicular Incursion Alert Systems and Methods filed Dec. 29, 2021, the entire disclosure of which is expressly incorporated herein by reference.

FIELD

The present invention relates generally to the fields of electronics, traffic engineering and public safety and more particularly to devices and methods useable for delineating bounds or path(s) of travel, channelizing vehicular traffic and enhancing safety in highway work zones.

BACKGROUND

Pursuant to 37 CFR 1.71(e), this patent document contains material which is subject to copyright protection and the owner of this patent document reserves all copyright rights whatsoever.

It is common for personnel, such as law enforcement, first responders, departments of transportation maintenance and construction workers, trucking and utility personnel, etc., to work in areas on or near roadways. Personnel working on roadways are subject to injury or death as a result of vehicles entering their workspace. Thus, there exists a need for a system that alerts personnel on the roadway when an approaching vehicle is on a trajectory that may lead to intrusion of their work area.

In some situations, it is possible to place temporary protective barriers, such as concrete or steel barriers, around a work zone or other protected area. However, placing such barriers is cumbersome and expensive and such barriers are not appropriate for short-term deployment. Intrusion alarms have come to market but can be expensive, challenging to deploy, subject to false triggering and, in some cases, difficult for workers to hear, see or feel in noisy or chaotic work zones, heavy construction sites, major accident scenes, etc.

Prior intrusion alarms have used radar or Lidar to scan a path ahead of the work zone and to detect vehicular incursions into the work zone. These technologies can be expensive and may consume considerable power thereby requiring that they be mounted on a trailer or other large, stationary object. If the work zone moves, it is typically necessary to move and/or re-aim the radar or Lidar system. The warning modality is typically a horn or vibration device worn by the worker. A vibration device worn outside clothing, especially in a colder climate, may be dampened and may not be felt. If the worker is using a power tool, the vibration device may become even less effective, as will sound alarms when ear protection is being worn.

SUMMARY

Disclosed are systems for alerting personnel of a vehicular incursion (e.g., entry or intrusion into) into a protected area, wherein the system comprises: at least one incursion sensing device positionable at a location on or near a protected area, said at least one incursion sensing device comprising a sensor configured to sense a vehicular incursion into the protected area; and a transmitter which transmits an incursion signal when the sensor senses an event indicative of a vehicle entering the protected area. A vehicle receiver/interface device is located in or connectable to a vehicle that is equipped with at least one alarm device (e.g., horn, siren, light , PA system), said vehicle receiver/interface device comprising; a receiver which receives the incursion signal from said at least one incursion sensing device; and circuitry connected to one or more components of the vehicle and configured to cause the audible or visual alarm(s) of the vehicle to emit an incursion alarm in response to receipt by the receiver of incursion signal.

In some embodiments the incursion sensing device is configured to sense a vehicular incursion into the protected area by sensing at least one incursion event selected from: a vehicle impacting the incursion sensing device; a vehicle overturning the incursion sensing device; a vehicle running over, crushing or compressing the incursion sensing device; a vehicle hitting the incursion sensing device; a vehicle causing movement of the incursion sensing device; a vehicle passing over the incursion sensing device; and/or a vehicle passing by the incursion sensing device.

In some embodiments, said at least one incursion sensing device may be included in (e.g., combined with or integrated in) an electronic flare that is positionable on or near a boundary of the protected area.

In some embodiments, the incursion sensing device(s) may comprise(s) a gyroscopic sensor, impact sensor, compression sensor, light detector, metal detector, pressure sensor or movement sensor positioned on or in the incursion sensing device(s).

In some embodiments, the incursion sensing device(s) comprise emitters(s) and sensor(s) may operate to emit and receive beam(s) or flow(s) of energy or tether(s), wherein interruption, blocking or disrupting of said beam(s), flow(s) of energy or tether(s) causes sensor(s) to detect a possible vehicle incursion and cause the transmitter to transmit the incursion signal to the vehicle receiver/interface device in response to the interruption or blocking of said beam(s) or flow(s) of energy. Such beam(s), flow(s) of energy or tether(s) may, for example, comprise one or more of: light, laser light, infrared light; ultrasound, mechanical tether.

In some embodiments, the incursion signal receiving/processing device may be configured for connection to a Controller Area Network (CAN) and/or Local Interconnect Network (LIN) of a vehicle, such as a service vehicle (e.g., emergency services vehicle, highway maintenance vehicle, etc.). A vehicle receiver/interface device may be connected to a CAN or LIN bus of the vehicle in a manner that will cause said incursion alarm to be emitted by said at least one alarm device (e.g., horn, siren, light, public address (PA) system, etc.) of the vehicle. In some such embodiments, the system may further comprise one or more remote alarm device(s), which may be located apart from the service vehicle, such remote alarm device(s) being operative to issue an additional incursion alert(s) which may be perceptible by person(s) within the protected area or other personnel. Also, the vehicle receiver/interface device may further comprise a transmitter which transmits a wireless alarm signal to one or more remote alerting device(s) to cause said one or more remote alarm device(s) to issue said additional incursion alert(s). In some embodiments, said one or more remote alarm device(s) may be mounted on or integrated into an article of clothing, device or piece of equipment; for example, a remote alarm device may comprise an LED light incorporated into or attached to a personal protective equipment such as eye protectors or headgear (e.g., a workers hard hat) wearable by personnel in the protected area.

In some embodiments, an incursion sensing device useable for sensing incursion of a vehicle into a protected area comprises: a housing, platform or body positionable on or near a boundary of a protected area; at least one sensing apparatus configured to sense at least one incursion event selected from: a vehicle impacting the incursion sensing device; a vehicle overturning the incursion sensing device; a vehicle running over, crushing or compressing the incursion sensing device; a vehicle hitting the incursion sensing device; a vehicle causing movement of the incursion sensing device; a vehicle passing over the incursion sensing device; and/or a vehicle passing by the incursion sensing device; and a transmitter in communication with said at least one sensing apparatus, said transmitter being configured to transmit a wireless incursion signal when said at least one sensing apparatus senses said at least one incursion event. In some embodiments, such said at least one sensing apparatus may comprise one or more of: gyroscopic sensor, impact sensor, compression sensor, light detector, metal detector, pressure sensor or movement sensor.

In some embodiments, an incursion sensing system comprises: at least a first incursion sensing device and a second incursion sensing device, wherein: the first incursion sensing device comprises at least an emitter which emits a beam, flow of energy or tether; and the second incursion device comprises a) at least one sensor which receives the beam, flow of energy or tether from the first incursion sensing device, b) a transmitter, and c) circuitry configured to cause the transmitter to transmit a wireless incursion signal when the sensor senses that the beam, flow of energy or tether has been interrupted, blocked or disrupted in a manner indicative of a possible vehicular incursion.

In some embodiments, a vehicle receiver/interface device is connected, or connectable to a vehicle that is equipped with at least one alarm device (e.g., horn, siren, light, PA system), said vehicle receiver/interface device comprising; a receiver configured to receive an incursion signal; and circuitry configured to cause the audible or visual alarm(s) of a vehicle to emit an incursion alarm in response to receipt by the receiver of an incursion signal.

In some embodiments, such vehicle receiver/interface device may be configured for connection to a CAN or LIN bus of a vehicle.

In some embodiments, a remote alarm or personal warning device comprises: an alarm mounted on or integrated into an article of clothing, a tool, a power tool, an article of personal safety or protective equipment or a piece of equipment useable for performing a task; a receiver configured to receive a wireless alarm triggering signal; and circuitry which causes activation of the alarm when the receiver receives an alarm triggering signal.

In some embodiments, a system comprises: at least one incursion sensing device or incursion sensing system in combination with a vehicle receiver/interface device and a personal warning or remote alarm device, wherein: the vehicle receiver/interface device is configured to receive an incursion signal from said at least one incursion sensing device or said incursion sensing system; and the personal warning or remote alarm device is configured to receive an alarm triggering signal from the vehicle receiver/interface device.

In some embodiments, a method for alerting personnel of a vehicular incursion into a protected area comprises the steps of: deploying an incursion sensing system of a type summarized above and operating said system to alert personnel of a vehicular incursion into a protected area.

Still further aspects and details of the present disclosure may be understood from, but shall not be limited by, the accompanying figures and the detailed description below.

BRIEF DESCRIPTION OF THE DRAWINGS

The accompanying FIGS. 1 through 5 show certain non-limiting examples or embodiments of the devices and methods disclosed in this provisional patent application. These drawings are illustrative but not limiting. These drawings are illustrative and are not intended to show all possible examples and embodiments of the herein-disclosed devices, systems and methods.

FIG. 1 is a general diagram of a system for alerting personnel of a vehicular incursion into a protected area.

FIG. 2 is a diagram of a roadside work zone (protected area) with an array of incursion sensing devices positioned along a boundary of the work zone, a service vehicle equipped with a vehicle receiver/interface device, and a worker who is equipped with an optional secondary or remote alarm device.

FIG. 3 shows one embodiment of an incursion-sensing roadside flare useable in accordance with the herein disclosed systems and methods.

DESCRIPTION AND EXAMPLES

The following description describes certain aspects of the present disclosure and, where relevant, refers to the non-limiting examples shown in the accompanying drawings.

Figure 1:
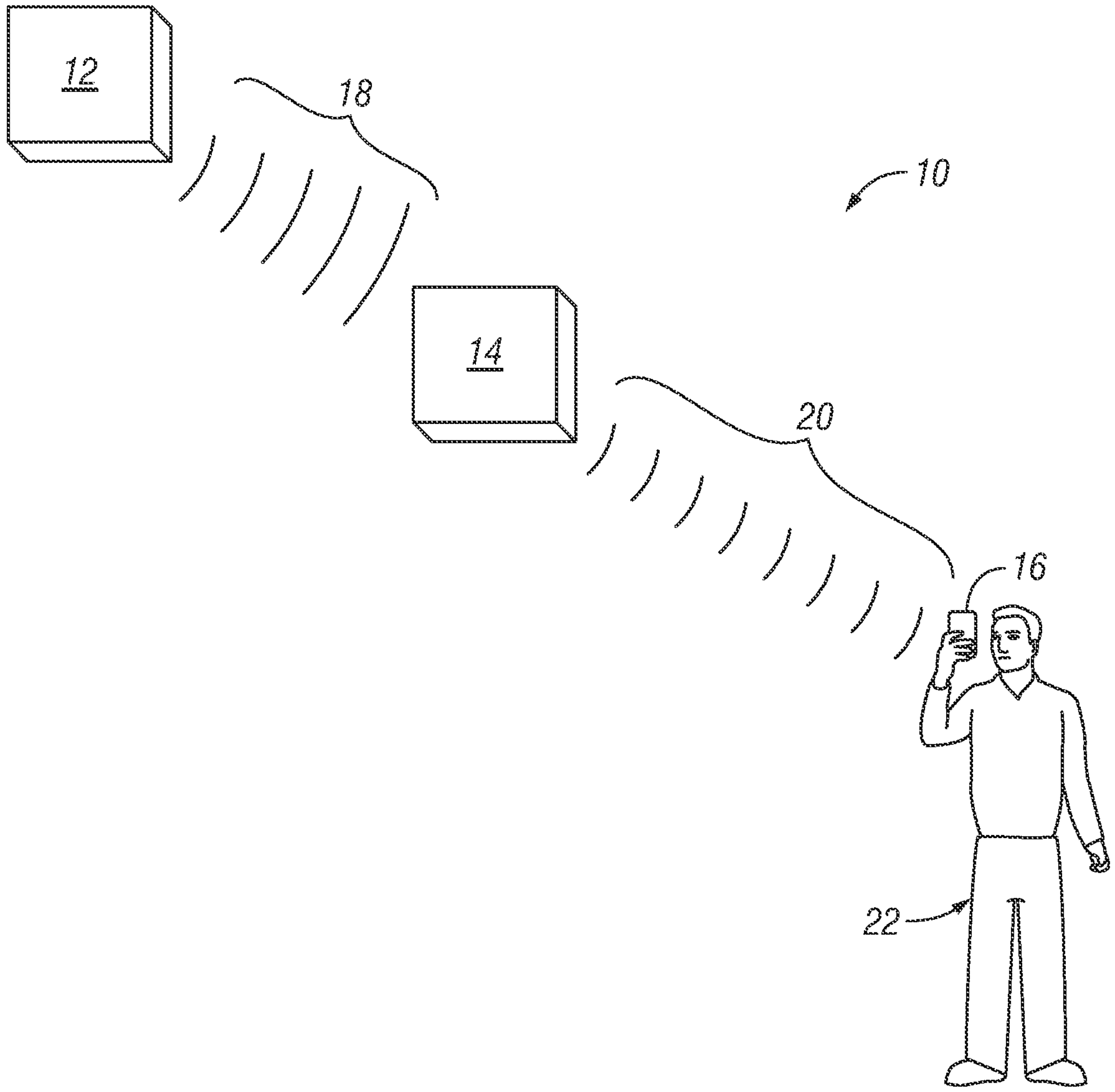

FIG. 1 shows a general diagram of a vehicular incursion alerting system 10 which comprises one or more incursion sensing device(s) 12, a receiver/interface device 14 and, optionally, one or more remote alarm device(s) 16.

Figure 2:
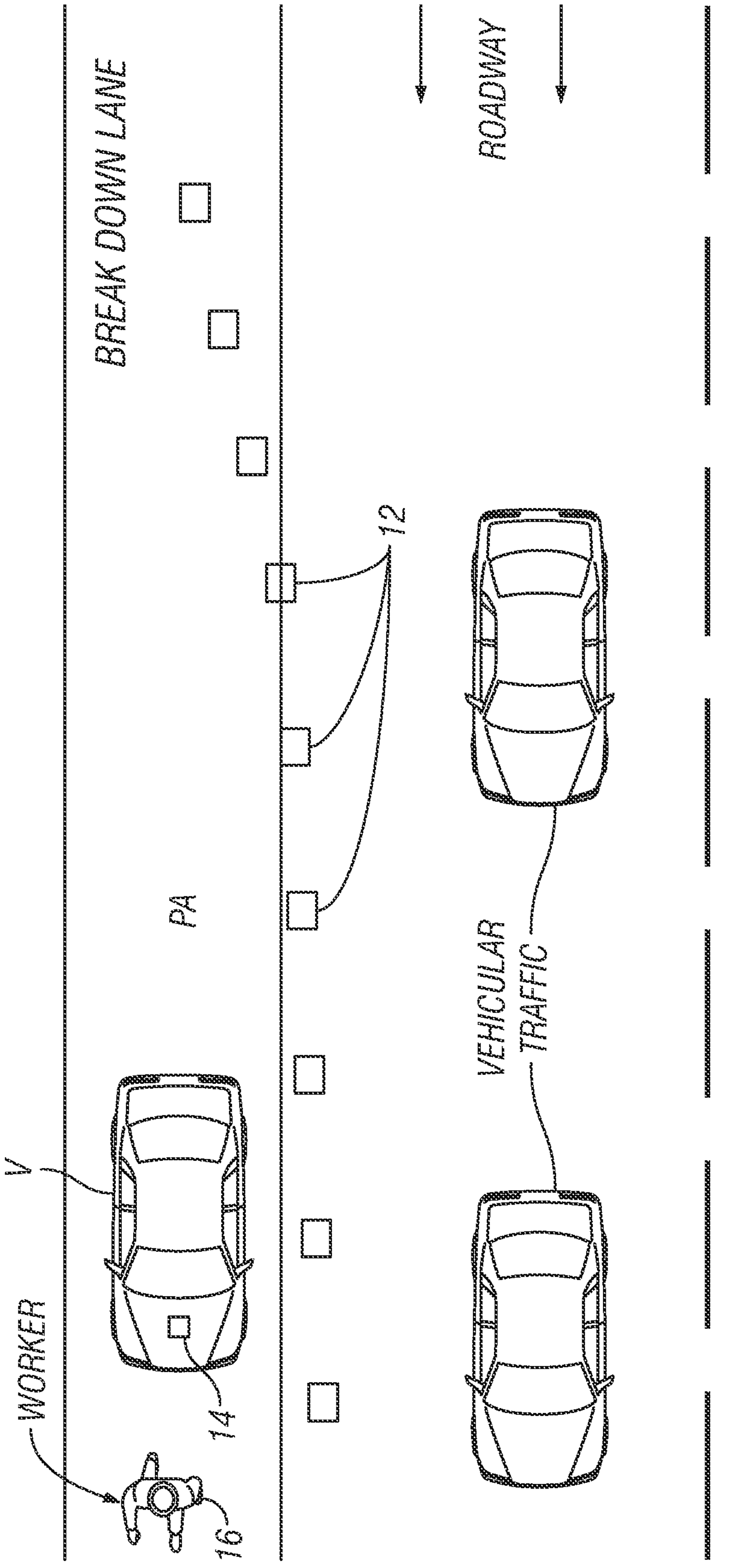

As may be appreciated from the showing of FIG. 2, the incursion sensing device(s) 12 is/are positionable on, along or near a boundary (e.g., an edge) of a protected area PA such as a work zone, accident site, area of law enforcement activity, etc. Such incursion sensing device(s) 12 is/are configured to sense a vehicular incursion into the protected area PA and to transmit a wireless (e.g., radio frequency) incursion signal 18 when the incursion sensing device(s) 12 sense that a vehicular has entered the protected area PA. In some embodiments, the incursion sensing device 12 may be configured to sense at least one of the following types of incursion events:

The vehicle receiver/interface device 14 is connected to or located in a vehicle V, such as a service vehicle, police vehicle, fire apparatus, etc., located in or near the protected area PA. The vehicle V is equipped with at least one audible or visual alarm device (e.g., a horn, light(s), siren, public address system, etc.). The vehicle receiver/interface device 14 is configured to receive the incursion signal 18 from the incursion sensing device(s) 12 and, in response thereto, to cause the vehicle's audible or visual alarm(s) to emit an audible or visual alarm indicating that a vehicular incursion has been detected.

In systems 10 which also include optional remote alarm device(s) 16, the incursion signal receiving/processing device 14 may additionally be equipped and configured to transmit a wireless (e.g., radio frequency) activation signal 20 to the optional remote alarm device(s) 16. Receipt of such activation signal 20 by the remote alarm device(s) 16 will cause the remote alarm device(s) 16 to issue additional incursion alarms signal(s) (e.g., visual, auditory and/or tactile signals) to further warn person(s) within the protected area PA of a sensed vehicular incursion. In this manner incursion alert signals may be emitted from both a service vehicle V positioned in or near the protected area PA and from one or more optional remote alarm device(s) 16 positioned on or near personnel who are working within the protected area. In addition, the interface/receiver device may include a cellular modem to provide alert and data communication to a Cloud server via cellular connectivity. Such cellular connectivity provides a conduit to deliver alert information to law enforcement, transportation departments, and to Cloud servers that provide mapping information for autonomous vehicles and traffic management systems operated by state and local governments.

Although the example of FIG. 2 depicts a protected area PA located in a highway and a land vehicle V, it is to be appreciated that the terms road, roadway and vehicle, as used herein, are not necessarily limited to land-based thoroughfares and land vehicles, but rather also includes waterways, areas and regions located on or near water (e.g., a river, stream or body of water) and various water vehicles (e.g., boats, ships, watercraft, hovercraft, boards, etc.).

Incursion Sensing Device(s)

The incursion sensing device(s) 12 may comprise sensors or detectors of any type operable to sense or detect when a vehicle has transitioned into a protected area PA. In some embodiments, the incursion sensing device(s) may comprise impact sensors, compression sensors, accelerometers, light detectors, magnetic or metal detectors, sound detectors, air pressure sensors, infrared heat sensors, radar or ultrasound proximity detectors, devices that emit and receive beams or flows of energy (e.g., infrared or laser light), or other devices operative to sense when impacted, overturned, run over or passed by a vehicle entering a protected area. In some embodiments, in addition to sensing when a vehicular incursion has occurred, the incursion sensing device(s) 12 may also perform a marking function by emitting light or other signals to illuminate or mark the boundary of the protected area PA.

Figure 3:
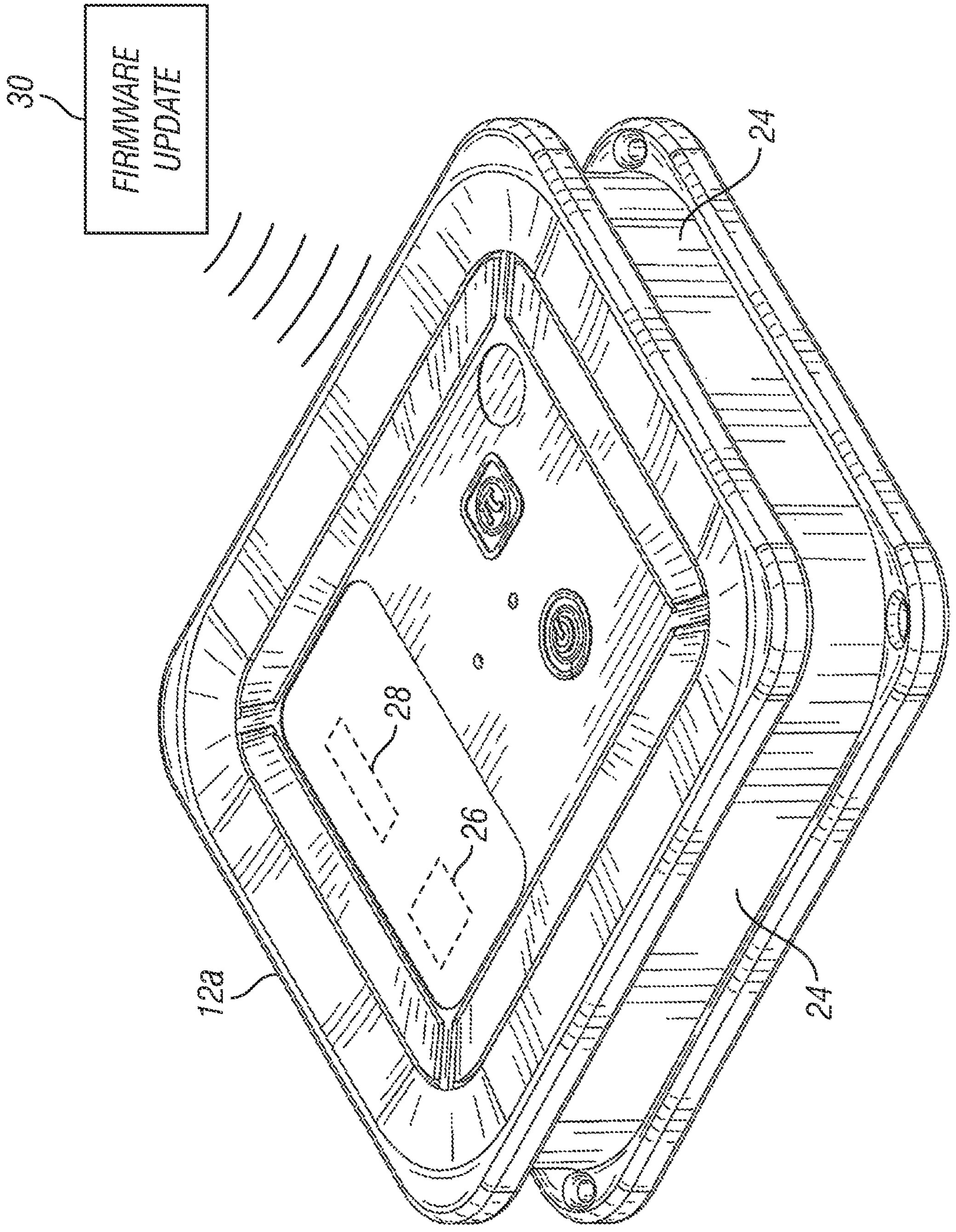

For example, FIG. 2 shows one embodiment of an incursion sensing device comprising sequential electronic roadside flare device 12*a* described in U.S. Pat. Nos. 11,162,650; 10,922,987; 10,551,014, 10,443,828; 9,847,037, 9,835,319; 9,288,088 and 8,564,456, the entire disclosures of each such patent being expressly incorporated herein by reference. Further examples of such devices also include Pi-Lit® sequential flashing flare, the Pi-Lit® sequential flashing Type A/C and B-lamps, along with other radio-connected devices available commercially from Pi Variables, Inc., Tustin, Calif. When placed on a generally horizontal roadway surface, the flare 12*a* shown in FIG. 3 emits flashes of light through a translucent sidewall 24. Such flashes of light are visible to oncoming vehicles. A plurality of these flares 12*a* may be place in a row along a boundary of a protected area PA (see FIG. 2). Such flares 12*a* are equipped with microcontroller unit (MCU) radiofrequency transceivers 26 (e.g. CC2530 ZigBee MCU-transceiver, Texas Instruments) to establish flare-to-flare radiofrequency communication whereby a plurality of the flares 12*a* can function as a mesh network, emitting flashes of light in a desired sequence or pattern. In addition to emitting light from the side wall 24 of the flare 12*a*, commercially available embodiments of the flare 12*a* are capable of alternately emitting light through a top wall of the flare when the flare 12*a* is placed in a vertical orientation (e.g., when attached to a post, wall, truck tailgate, etc.). In this example, the flare 12*a* is equipped with an accelerometer 28 which detects when the flare 12*a* has been moved from a horizontal orientation to a vertical orientation (or vice versa) and cause the flare's light emitters to shift from a side-emitting mode or a top-emitting mode (or vice versa) in response to such change in horizontal/vertical orientation of the flare 12*a*. However, such accelerometer 28 is also operative to sense when the flare 12*a* is impacted or overturned by a vehicle, or when wind wake produced by a vehicle in proximity results in vibration detected by the accelerometer. Flares 12*a* equipped with the radiofrequency transceiver 26 and accelerometer 28 may be programmed to cause the radiofrequency transceiver 26 to transmit an incursion signal 18 to the receiving/processing device 14 when the accelerometer detects being run over or impacted by a vehicle, in addition to the routine flare-to-flare radiofrequency communication that enables the flares to emit their light flashes in the desired sequence or pattern. Newly manufactured flares 12*a* may be equipped and programmed for both the routine flare-to-flare (e.g., mesh network) communication and to transmit the incursion signal 18 to the receiving/processing device 14 at the time of manufacture. Alternatively, pre-existing flares 12*a* equipped with the accelerometer 26 and radiofrequency transceiver 26 and programmed from routine flare-to-flare communication may be modified, such as by way of a firmware update 30, to additionally cause the radiofrequency transceiver 26 to send an incursion signal 18 to the receiving/processing device 14 when the accelerometer 28 senses that the flare 12*a* has been impacted or run over by a vehicle.

In some embodiments, the incursion sensing device 12 or 12*a* may be equipped with multiple LEDs or a photodetector for detecting changes in ambient light as a vehicle passes over the device 12*a* even if the vehicle does not actually impact or move the device 12*a*. LEDs, when reversed biased, can be used as photodetectors, thereby allowing use of a flare designed for light emission to perform as a light detector. Using Hall Effect electronic components or other ferrite metal detectors would also allow for sensing of a vehicle trajectory that brings it close to the sensor and therefore presenting danger to the worker. Similarly, changes in air pressure, or vibratory motion of the sensor created by a pressure wave produced by the vehicle could be sensed by a pressure sensor or by the accelerometer.

Figure 4A:
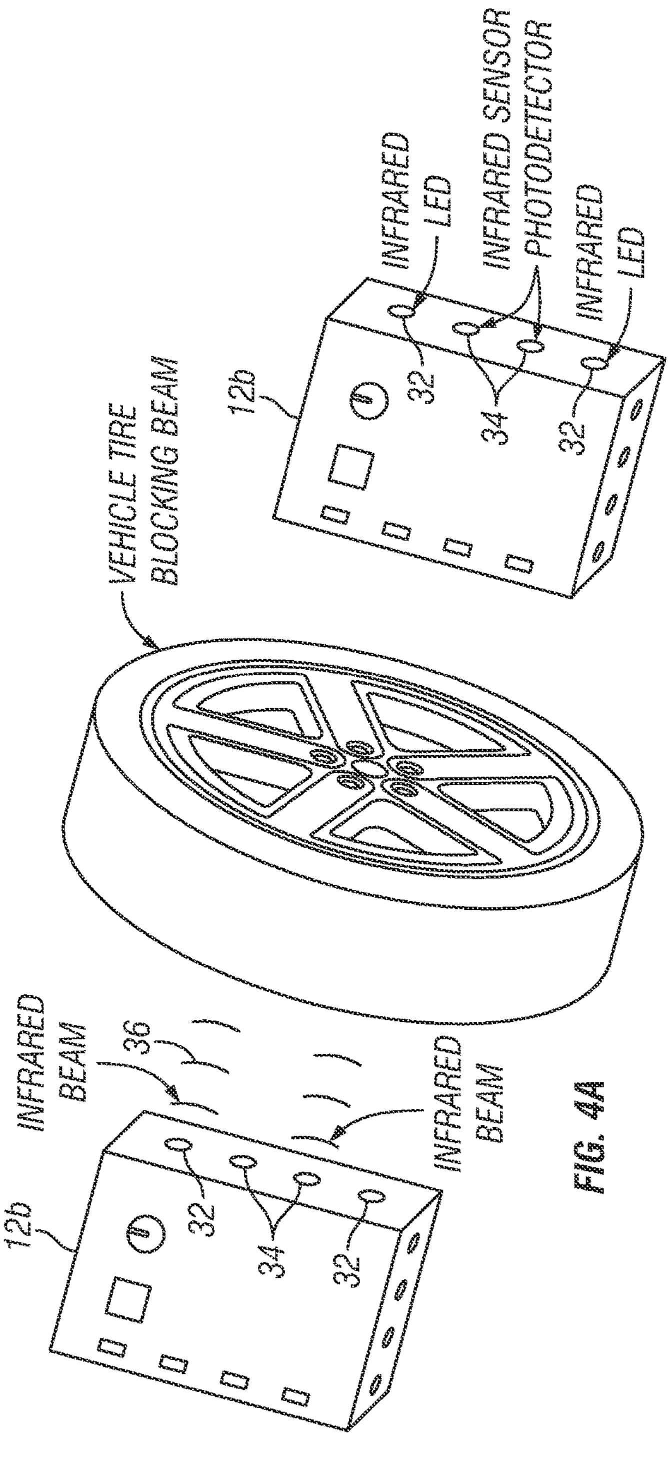
FIG. 4A is a diagram showing another embodiment of incursion-sensing device configured to project a beam or flow of energy (e.g., infrared light, laser light, etc.) along a boundary of a protected area and to emit an incursion signal when that beam or flow of energy is disrupted or interrupted by a vehicle entering the protected area.
Figure 4B:
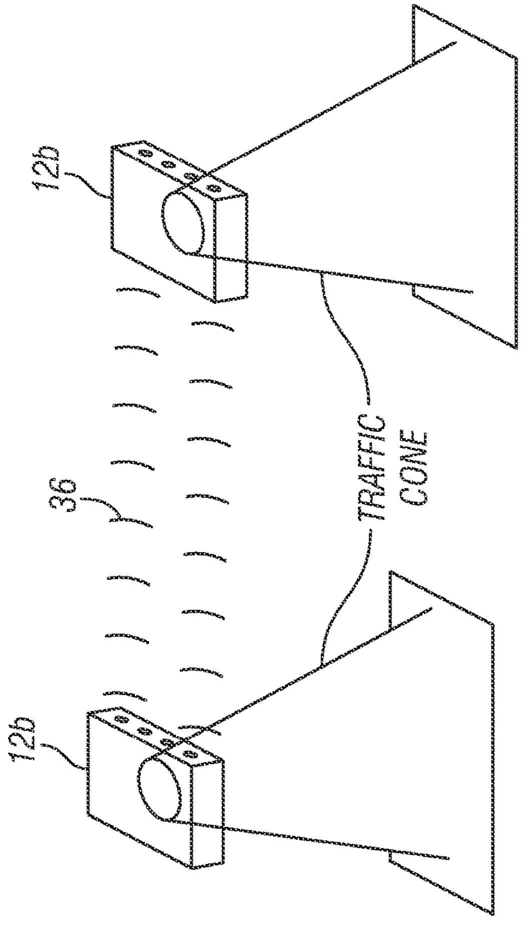
FIG. 4B is a diagram showing incursion-sensing devices of the type shown in FIG. 4A mounted on traffic cones.

In addition, or as an alternative to sensing when a vehicle has impacted, moved or passed directly over an incursion sensing device 12, some embodiments of incursion sensing devices 12 may emit and detect beam(s) or flow(s) of energy (e.g., light, laser light, infrared light, ultrasound, etc.) or tether(s) (e.g., mechanical members, wires, strings, etc.) which, when interrupted, blocked or disrupted by a vehicle incursion, will cause the incursion sensing device 12 to transmit an incursion signal 18. FIGS. 4A and 4B show an example of such a device.

FIG. 4A shows an incursion sensing device 12*b* equipped with infrared beam emitter(s) 32 and infrared beam sensor(s) 34 (e.g., photodetectors). A plurality of these incursion sensing devices 12*b* may be placed in a row or array along a boundary of, or near, or within, a protected area PA, an example of which is shown in FIG. 2. Infrared beam(s) 36 emitted by the emitters 32 of one device 12*b* are be received by the beam sensors 34 of a neighboring device 12*a*, unless interrupted or blocked by an object passing between the neighboring devices 12*b*. If infrared beam(s) 36 emitted from one device 12*b* is/are interrupted or blocked by a vehicle tire or wheel passing between that device 12*b* and a neighboring device 12*b*, the infrared sensor(s) 34 of the neighboring device 12*b* will cease receiving such infrared beam(s) 36 and, in response, the neighboring device 12*b* will transmit an incursion signal 18 as described above. The infrared emitters 32 and sensors 34 can be relatively inexpensive thereby making it feasible in at least some applications to utilize incursion sensing devices 12*b* that are equipped to emit/receive multiple infrared beams. For example, multiple infrared emitters and receivers could be located around the incursion sensing device 12 to provide 360-degree coverage. This would provide ease of deployment and may minimize or eliminate any need for specific aiming of each device 12*b* to cast a beam or flow of energy so that it is received by a sensor 34 of a neighboring device. The beam could be formed by a LASER diode, ultrasonic sound, mechanical tether (string, wire) or other proximity sensor. A proximity sensor could be used to detect the presence of a tire or vehicle within a few centimeters or meters of the sensor. Stated alternatively, the sensor need not be impacted to detect a vehicle on a dangerous trajectory.

Radar, LIDAR, Microwave: An alternative embodiment would use visual technology to detect and track a vehicle on a path that might imperil workers on the roadway. A video camera or LIDAR would identify the vehicle and with adequate processing power could resolve that a vehicle is approaching with minimal latency. Radar or microwave detection would provide significant range extension such that the operator need not place the sensors many hundreds of meters in the direction of oncoming traffic.

In some embodiments, incursion sensing devices 12 may be mounted on or integrated as part of other traffic channelizing or marking devices, such as traffic cones, tubular delineators, barrels, fences, rails, etc. FIG. 4B shows an example wherein the incursion sensing devices 12*b* are mounted on traffic cones. In some embodiments incursion sensing device(s) may be integrated or combined with lights or signaling devices that are mounted on or part of a traffic channelizing or marking devices, such as traffic cones, tubular delineators, barrels, fences, rails, etc., one non-limiting example of which is commercially available as the pi-Lit Sequential SunFlower Cone-Top Warning Lamp (Pi Variables, Tustin, Calif.) and another non-limiting example of which is described in United States Patent Application Publication Nos. 2021/0237777, the entire disclosure of which is expressly incorporated herein by reference.

In some embodiments, where feasible, components or attributes of one of the above-described incursion sensing devices 12*a*, 12*b* may be combined in a single device. For example, a single incursion device 12 may have both an impact or motion sensor (e.g., an accelerometer, motion detector, MEMS, etc.) and emitters/sensors for emitting and receiving a beam, flow of energy or tether. Such incursion sensing devices 12 equipped with both impact/motion sensors and beam/flow of energy/tether emitters/sensors would detect vehicular incursions irrespective of whether the vehicle actually hits, impacts, runs over top of, or passes between, the incursion sensing device(s) 12.

Vehicle Receiver/Interface Device

Figure 5A:
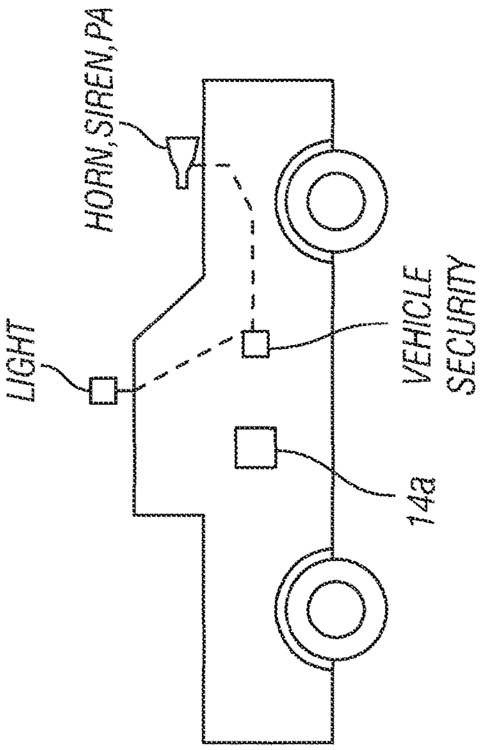
FIG. 5A shows a vehicle equipped with a vehicle receiver/interface device which receives incursion signal(s) from an incursion sensor such as the flare of FIG. 1 and, in turn, causes the vehicle to emit incursion warning(s).
Figure 5B:
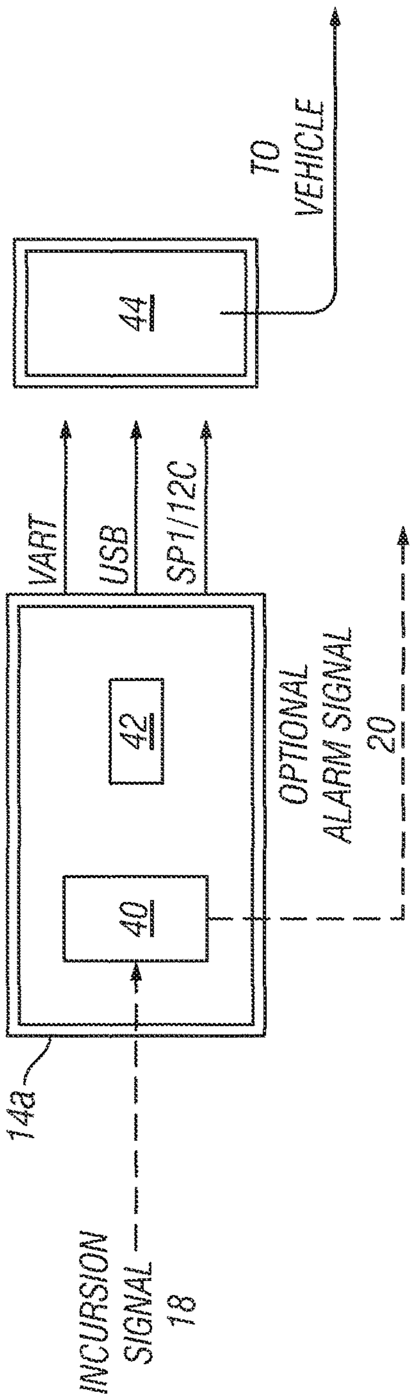
FIG. 5B is a component diagram showing one example of a vehicle-mounted vehicle receiver/interface device that may be connected to or integrated into a vehicle to receive incursion signal(s) from an incursion sensor, such as the flare of FIG. 1, and to cause the vehicle to emit incursion warning(s) in response to the receipt of such incursion signal and, optionally, to also transmit an activation signal to one or more alert devices located on or near personnel within the protected area.
Figure 6:
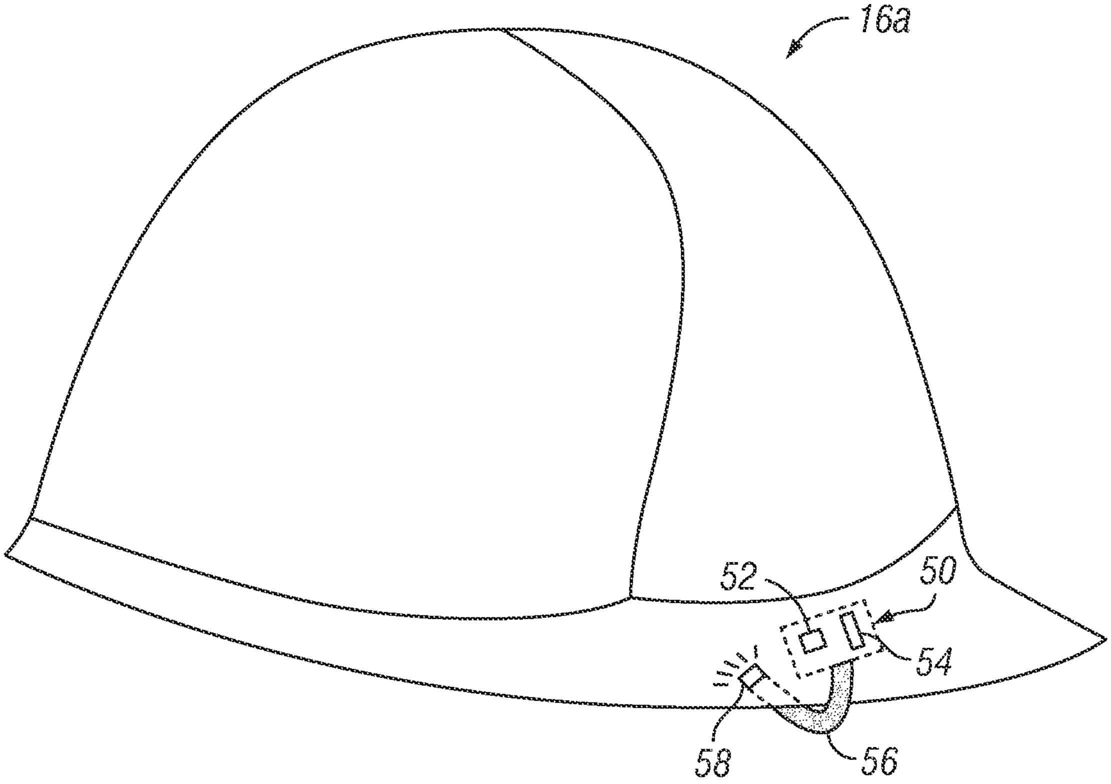
FIG. 6 shows one example of a secondary or remote alarm device, which may be attached to a hard hat, other item of clothing, personal equipment or other item, object or structure located on or near personnel within the protected area, such alert device being configured to receive activation signals emitted by the vehicle receiver/interface device and to emits an alarm (e.g., visual, auditory and/or tactile) to further warn personnel in the protected area of a sensed vehicular incursion.

FIGS. 5A and 5B show one example of a vehicle receiver/interface device 14*a* that is either located in or connected to a vehicle V, such as a service vehicle, police vehicle, fine engine, etc., which may be located in or near the protected area PA. This vehicle receiver/interface device 14*a* is configured to receive an incursion signal 18 from incursion sensing device(s) 12 and, in response to receipt of such incursion signal 18, to cause the vehicle V to emit alarms from vehicle-mounted devices such as lights, siren, horn, public address system, etc. Optionally, the vehicle receiver/interface device 14*a* may additionally be configured to transmit a wireless alarm signal 20 to any secondary or remote alarm 16 located apart from the vehicle V. In this latter configuration where the receiver/interface device 14*a* transmits a signal to a remote alert device 16, the receiver/interface device 14 need not be connected mechanically or electrically to the vehicle V but in proximity (radio range) of the alert device 16. For ease of deployment and to ensure availability when needed, locating the receiver/interface device in or mechanically attaching it to the vehicle is an option.

In the example of FIG. 5A, the vehicle receiver/interface device 14*a* may be manufactured as part of the vehicle V at the time of the vehicle's manufacture, or it may be retrofit or attached to the circuitry of a previously manufactured vehicle V.

When the vehicle receiver/interface device 14*a* receives an incursion signal 18 from an incursion sensing device 12, it in turn sends signal(s) via the vehicle's circuitry to activate one or more vehicle alarm(s) (e.g., light(s), horn, siren, public address (PA) speakers system, etc.) in a manner intended to alert personnel located within the protected area PA. In some embodiments, the vehicle alarm(s) may be caused to issue a unique incursion alarm signal (e.g., a specific pattern of sounds, light flashes, etc.) that will be understood by personnel to indicate a detected vehicular incursion into the protected area PA.

FIG. 5B is a diagram showing components and operative connections of one embodiment of the vehicle receiver/interface device 14*a*. Many modern vehicles may incorporate Controller Area Network (CAN) and/or Local Interconnect Network (LIN) modules to implement various components of the vehicle such as vehicle-mounted lights, actuators, climate control systems, seat controls, etc. using a microcontroller. The receiving/processing device 14*a* may connect to the CAN bus of a vehicle V that is so equipped. In the example shown, the receiving/processing device 14*a* includes an MCU radiofrequency receiver (or transceiver) 40 [e.g., CC2530 ZigBee MCU radio transceiver, Texas Instruments) and a CAN/LIN bus transceiver 42 (e.g., ATA6570, MCP2518FD, ATA6562, ATA6563, ATA6564, Microchip Corporation) which is connected to the vehicle's CAN/LIN bus 44. Alternatively, actuation of a warning signal in the vehicle could be accomplished without use of the CAN/LIN system, for example by integration of the warning notification from the sensor into a vehicle's On Board Diagnostics II (OBD2), or by use of dedicated switches that would activate lights, horn, siren, or other vehicle mounted alarm device. Such switches or similar switches are used by vehicle "outfitters" such as Whelen Engineering Company, Inc., Chester, CT, USA; ECCO, Boise, ID, USA and Code3, St. Louis, Mo., USA. These companies provide electronic and lighting systems for chassis manufactured by other OEMs.

The MCU radiofrequency receiver (or transceiver) 40 may be set to listen (constantly or very frequently) for any incursion signal 18 from an incursion sensing device 12 or 12*a* on a desired frequency (e.g., 2.4 GHz, 900 MHz band or 1 GHz band).

When the MCU radiofrequency receiver (or transceiver) 40 receives an incursion signal 18 from an incursion sensing device 12 , 12*a*, the CAN/LIN bus transceiver 42 promptly sends a signal to the vehicle's CAN/LIN bus 44 which causes an incursion alarm to be emitted from one or more of the vehicle's apparatus (e.g., horn, lights, siren, PA system, etc.) The CAN/LIN transceiver 42 may be connected to the vehicle's CAN/LIN bus 44 by any suitable means such as, for example via standard protocols such as UART, USB, SPI I-squared-C, or direct input-output. The vehicle receiver/interface device 14*a* may be powered by any suitable means such as, for example, by a combination of the 12-, 24-, or 48-volt vehicle power bus, or via a DC to AC inverter, and an internal battery backup to prevent malfunction should the vehicle power supply be disrupted. One example of such a situation may be, if the vehicle receiver/interface device 14*a* is plugged into a vehicle's power receptacle (e.g., cigarette lighter) and vibration or inadvertent movement causes such connection to be disrupted, the internal battery (if present) would assure continuous operation.

As an alternative to a CAN/LIN bus connection as shown in FIG. 4B the vehicle receiver/interface device could, in some embodiments, comprise a direct radio-controlled switch connected to a horn relay, light relay, siren relay, PA system relay, etc. so as to cause direct activation. This may be applicable in older vehicles not equipped with CAN/LIN system, or to a modern vehicle if CAN/LIN is not available or the vehicle owner prefers not to connect to CAN/LIN. In such embodiments, the CAN/LIN transceiver 42 of the device 14*a* would be replaced by a switch that is directly activated when the MCU radiofrequency receiver or transceiver 40 receives an incursion signal 18 form an incursion sensing device 12, 12*a*.

In systems that include one or more optional remote alarm device(s) 16, the MCU radiofrequency receiver or transceiver 40 of the vehicle receiver/interface device 14*a* will comprise a transceiver (or will include a separate transmitter) which promptly transmits the alarm signal 20 to the optional remote alarm device(s) 16 causing them to also emit warning alarms. In this embodiment the device 14*a* need not be connected to the vehicle or to the vehicles electrical system, and the CAN/LIN component 42 is not required. Radio receiver 40 of device 14*a* will then perform as another node in the mesh network of sensors 12 and relay warning signals sent to it by sensors 12 to the remote warning device 16.

Remote Alarm/Personal Warning Devices

In embodiments of the system 10 that include one or more remote alarm device(s) 16, such remote alarm device(s) 16 may be located near or actually on persons who are working within the protected area PA. Thus, in some instances remote alarm device(s) 16 may be positioned on posts, walls, pieces of equipment, tools or articles of clothing on or near the personnel. One example, is a headgear-mounted remote alarm 16*a* as shown in FIG. 5.

As shown in FIG. 5, the headgear mounted remote alarm 16*a* comprises a warning device 50 that is integrated in or attached to a headgear, such as a hard hat or helmet. In this example, the warning device 50 comprises a power source 52 such as a battery, a radiofrequency receiver 54 and a light emitting diode (LED) 58. In some embodiments the LED 58 may be attached to a formable or adjustable stalk 56. The radiofrequency receiver 54 listens (constantly or very frequently) for any alarm signal 20 transmitted from the vehicle receiver/interface device 14*a*. Upon receipt of such alarm signal 20, the circuitry of the warning device 50 actuates the LED 58 causing the LED to emit a warning light. In embodiments that include the stalk 56, the wearer of the headgear may adjust the stalk 56 so that the LED is within, but not obstructing, the wearers field of vision when performing intended tasks, thereby helping to ensure that the wearer will promptly perceive any warming light emitted from the LED 58.

Further Information/Additional Components/Alternatives

In some embodiments of the system 10, the incursion sensing device(s) 12, 12*a*, 12*b* may also function as sequential light emitting electronic flares. Such sequential flares typically undergo flare-to-flare radiofrequency communication to maintain their desired flashing sequence or pattern, the radiofrequency MCU transceivers may be in a quiescent low-power mode for much (e.g., 99%) of the time and become activated to receive incoming signals from other flares only at certain times. This enables the flares to conserve power while operating in the intended manner. In contrast, it is important for the present system to promptly receive and act upon any incursion signal 18 emitted from even a single incursion sensing device 12, 12*a*, 12*b*. Thus, in embodiments where a number for the incursion sensing devices 12, 12*a*, 12*b* are functioning as nodes of a mesh network, it may be desirable or necessary for an incursion signal 28 initiated from one of the incursion sensing devices 12, 12*a*, 12*b* to be passed along or transmitted to/from other incursion sensing device(S) 12, 12*a*, 12*b* before reaching the MCU radiofrequency receiver (or transceiver) 40 of this vehicle receiver/interface device 14, 14*a*. Thus, in at least some such embodiments, it will be important for all of the incursion sensing device(s) 12, 12*a*, 12*b* to remain in active receive mode and able to receive/retransmit an incursion signal 18 with minimal latency or delay. Thus, when operating as part of the present system 10, existing electronic flares of the type described above may be set or reprogrammed to remain active continuously or nearly continuously. Accordingly, in some embodiments, the system may utilize both mesh and non-meshed radio architecture. Mesh architecture allows is for low-power radio use because in mesh architecture the radio does not have to be powered on all of the time. Rather, the mesh system is configured to determine when to transmit and when to listen to minimize power consumption while not broadcasting concurrently with one another (e.g., "stepping on" each other's transmission). In some embodiments of the herein-disclosed incursion sensing device(s) 12, 12*a*, 12*b*, the speed of notification may be critical, so all of the radios of the incursion sensing devices 12, 12*a*, 12*b* may utilize non-mesh architecture and may be required to be listening all of the time. In a non-meshed radio architecture, all of the nodes (e.g., the sensing devices 12, 12*a*, 12*b*) that encompass the network will be in receive mode (listening). One or more of those sensors that are impacted, or experience a change in ambient light, or magnetic field, or sound or pressure change, as a result of a passing vehicle violating the boundary of a work zone or area where personnel are working, may be out of range of the warning siren, flashing light, headgear radio receiver, etc. The warning signal transmitted will, however, be received by another, closer, node or nodes. Each node that receives the alert signal will relay the alert to other nodes by transmitting, then listening, to determine whether other nodes are transmitting. If a transmission is received, each node will wait a pre-programmed time delay and then send the alert again. In this way, an uncorrupted signal will propagate to the helmet receivers, vehicle receiver, siren, or other emitters, to alert personnel. The consequence of using such non-mesh architecture is that battery power consumption may be greater. However, in applications where the system is used for limited or relatively short periods of time, recharging and redeployment of the system or replacement of batteries may be feasible to maintain adequate power. Hence, the added energy burden (e.g., more frequent recharging or replacement of batteries) of a non-meshed network may, in some applications, be an acceptable requirement given the benefits of a) a less complicated radio system and b) faster propagation of the warning signal to the personnel at risk.

As explained above, some electronic sequential flares useable as part of this system 10 may require periodic battery replacement or recharging (e.g., every 18 hours in some cases). However, many of the intended uses for this system 10 are at emergency/accident scenes or roadway worksites, which may typically remain in operation for limited periods of time, such as ten hours or less.

Also, in some embodiments or applications, it may not be feasible for the receiver/interface device 14 to be connected to a vehicle V. Therefore, in some embodiments, rather than interacting with a vehicle V, the receiver/interface device 14 may be placed on a stand, post, wall or other object located in or near the protected area PA and connected directly to an alarm device such as a horn, light siren etc.

In some embodiments, the system 10 may also be equipped to provide upstream mapping and/or location information to oncoming vehicles (including manually driver and/or autonomous vehicles) or other remote locations using, cellular, fiber optic, hard-wired, internet and/or Cloud services, or through direct infrastructure-to-vehicle communication. Such services include examples such as Waze and Google Maps, Here Technologies, or Haas Alert. The location of the multiple elements (nodes, flares, lamps, geo-tags) of the intrusion alarm, location enabled with GNSS (GPS) can be delivered by Cloud connectivity to onboard mapping systems in production automobiles that will both display the position and nature of the approaching incident or work zone and be analyzed and incorporated into onboard and cloud computers to guide autonomous vehicles and human drivers. These data, including location, temperature, vibration, impact, vehicle count, speed of vehicle, presence of a queue of vehicles, can provide ground truth information for departments of transportation, the autonomous vehicle and Cloud servers that support them, and for mapping services. In addition, indication of a vehicular incursion into a work area could be forwarded, once received by the Cloud server, to law enforcement or medical personnel. Law enforcement, often positioned near the work zone or road incident, could then be notified quickly enough that the offending driver could be located or apprehended. The transportation department upon notification might alert drivers via fixed and mobile message boards that an incident has occurred ahead of their position.

Although the invention has been described hereabove with reference to certain examples or embodiments of the invention, various additions, deletions, alterations and modifications may be made to those described examples and embodiments without departing from the intended spirit and scope of the invention. For example, any elements, steps, members, components, compositions, reactants, parts or portions of one embodiment or example may be incorporated into or used with another embodiment or example, unless otherwise specified or unless doing so would render that embodiment or example unsuitable for its intended use. Also, where the steps of a method or process have been described or listed in a particular order, the order of such steps may be changed unless otherwise specified or unless doing so would render the method or process unsuitable for its intended purpose. Additionally, the elements, steps, members, components, compositions, reactants, parts or portions of any claim or example described herein may optionally exist or be utilized with elimination of, or in the absence or substantial absence of, any one or more of the specified elements, steps, members, components, compositions, reactants, parts or portions, unless otherwise noted. All reasonable additions, deletions, modifications and alterations are to be considered equivalents of the described examples and embodiments and are to be included within the scope of the following claims.

What is claimed is:

1. A system comprising:

a vehicle receiver/interface device which is connectable to a Controller Area Network (CAN) or Local Interconnect Network (LIN) of a service vehicle that has at least one of: a horn, siren, light, or public address system that can be actuated through said Controller Area Network (CAN) or Local Interconnect Network (LIN); and at least one incursion sensing device positionable a spaced distance away from the service vehicle on or near an edge or boundary of a protected area;

wherein said at least one incursion sensing device comprises a sensor which senses an incursion event indicative of a vehicle crossing said edge or boundary of the protected area, and a transmitter which wirelessly transmits an incursion signal to the vehicle receiver/interface device when the incursion sensing device senses an incursion event; and wherein the vehicle receiver/interface device comprises a receiver configured to receive said wireless incursion signal and circuitry configured to cause said at least one of: a horn, siren, light or public address system, to emit an incursion alarm in response to receipt of said incursion signal.

2. A system according to claim 1 wherein the vehicle receiver/interface device comprises an MCU radiofrequency receiver or transceiver and a CAN/LIN bus transceiver configured to connect to said Controller Area Network (CAN) or Local Interconnect Network (LIN) of the service vehicle.

3. A system according to claim 1 wherein CAN/LIN bus transceiver connects to the Controller Area Network (CAN) or Local Interconnect Network (LIN) of the service vehicle using a protocol selected from: UART, USB, SPI I-squared-C, or direct input-output.

4. A system according to claim 1 wherein the MCU radiofrequency or transceiver comprises a ZigBee MCU radio transceiver.

5. A system according to claim 1 wherein the incursion event is selected from:

impacting the incursion sensor device;
overturning the incursion sensing device;
running over, crushing or compressing the incursion sensing device;
hitting the incursion sensing device;
causing movement of the incursion sensing device;
an object passing over the incursion sensing device; and/or
an object passing by the incursion sensing device.

6. A system according to claim 1 wherein said at least one incursion sensing device is/are attached to or integrated in electronic flare(s) or warning light(s).

7. A system according to claim 1 wherein said sensor which senses an incursion event comprises a device selected from: gyroscopic sensor, impact sensor, compression sensor, light detector, metal detector, pressure sensor, or movement sensor.

8. A system according to claim 1 wherein said at least one incursion sensing device comprises a plurality of said incursion sensing devices positionable at spaced apart locations on or near an edge or boundary of the protected area.

9. A system according to claim 8 wherein:

a beam or flow of energy is transmitted between adjacent ones of said incursion sensing devices; and
wherein said sensor which senses an incursion event is configured to sense when the beam or flow of energy is blocked or disrupted.

10. A system according to claim 9 wherein the beam or flow of energy comprises one or more of: light, laser light, infrared light; ultrasound.

11. A system according to claim 9 wherein a tether extends between adjacent ones of said incursion sensing devices and wherein a vehicle impacting or driving over said tether causes at least one of the incursion sensing devices to transmit the incursion signal to the service vehicle.

12. A system according to claim 1 wherein:

the system further comprises at least one remote alarm device located apart from the service vehicle, said at least one remote alarm device being operative to issue an additional incursion alert that is perceptible by said person(s) within the protected area; and
the vehicle receiver/interface device further comprises a transmitter which transmits a wireless alarm signal to said at least one remote alarm device to cause said at least one remote alarm device to issue said additional incursion alert.

13. A system according to claim 12 wherein said at least one remote alarm device is/are mounted on or integrated into a post, a wall, a tool, an article of clothing, a device or piece of equipment.

14. A system according to claim 12 wherein said at least one remote alarm device is attached to or incorporated in a hard hat or other headgear wearable by personnel in the protected area.

15. A system according to claim 1 further comprising a cellular modem.

16. A system according to claim 15 wherein the cellular modem is configured to transmit notification of an incursion alarm to a remote location.

17. A system according to claim 16 wherein the remote location comprises at least one of:

a law enforcement facility, a transportation department facility, a Cloud server.

18. A system according to claim 16 wherein the cellular modem transmits notification of an incursion alarm to a server which in turn causes location data enabled with GNSS (GPS) to be delivered to navigation or mapping systems in vehicles approaching the protected area.

19. A system according to claim 1 wherein said at least one incursion sensing device is/are positioned on or integrated in flare(s) that are positionable along an edge or boundary of the protected area.

20. A system according to claim 1 wherein said at least one incursion sensing device is/are positioned on or integrated in traffic channelizing device(s), marking device(s), traffic cone(s), traffic delineator(s), barrel(s), fence(s) or rail(s) that are positionable along an edge or boundary of the protected area.

21. A system according to claim 1 wherein:

said at least one incursion sensing device comprises a series of said incursion sensing devices placed at spaced apart locations along an edge or boundary of the protected area;
said incursion sensing devices further comprising emitters which emit visible or invisible light;
said incursion sensing devices are in radiofrequency communication with one another; and
said incursion sensing devices further comprise circuitry which causes said series of incursion sensing devices to function as a network, emitting flashes of said visible or invisible light in a particular sequence or pattern.

* * * * *